(12) United States Patent
Chen et al.

(10) Patent No.: US 7,649,525 B2
(45) Date of Patent: Jan. 19, 2010

(54) DISPLAY SYSTEMS WITH MULTIFUNCTIONAL DIGITIZER MODULE BOARD

(75) Inventors: Din-Guo Chen, Taipei (TW); Ying-Chih Lee, Shengang Township (TW)

(73) Assignee: TPO Displays Corp., Chu-Nan (TW)

( * ) Notice: Subject to any disclaimer, the term of this patent is extended or adjusted under 35 U.S.C. 154(b) by 714 days.

(21) Appl. No.: 11/312,285

(22) Filed: Dec. 19, 2005

(65) Prior Publication Data

US 2006/0146034 A1 Jul. 6, 2006

Related U.S. Application Data

(60) Provisional application No. 60/641,345, filed on Jan. 4, 2005.

(51) Int. Cl.
*G06F 3/041* (2006.01)
(52) U.S. Cl. .................. 345/173; 345/174; 345/175; 345/176; 345/177; 345/178; 178/18.01; 178/18.03
(58) Field of Classification Search ............... 345/173, 345/174, 175, 176, 177, 178; 178/18.01, 178/18.03, 18.04, 18.05, 18.06, 18.09, 18.11
See application file for complete search history.

(56) References Cited

U.S. PATENT DOCUMENTS 5,218,173 A 6/1993 Garwin et al.
5,349,668 A * 9/1994 Gladstein et al. ............ 713/340
5,790,106 A * 8/1998 Hirano et al. ............... 345/173
5,945,980 A * 8/1999 Moissev et al. ............. 345/173
6,028,594 A * 2/2000 Inoue ........................ 345/173
6,756,970 B2 * 6/2004 Keely et al. ................ 345/173
2002/0031622 A1 * 3/2002 Ippel et al. .................. 428/1.6
2004/0135773 A1 7/2004 Bang et al.
2006/0146033 A1 * 7/2006 Chen et al. ................. 345/173

FOREIGN PATENT DOCUMENTS

| JP | 09-062442 | 3/1997 |
|---|---|---|
| JP | 2003-279937 | 10/2003 |
| JP | 2004-348270 | 12/2004 |
| TW | 571161 | 1/2004 |

* cited by examiner

*Primary Examiner*—My-Chau T Tran
(74) *Attorney, Agent, or Firm*—Liu & Liu

(57) ABSTRACT

Display systems with multifunctional digitizer module board. A shield film is integrated on a digitizer sensor board to form a multifunctional digitizer module board with lower thickness and weight. In the multifunctional digitizer module, a digitizer sensor board senses position of a position pointer or finger contact on a surface and a shield film is integrated on one surface of the digitizer sensor board by semiconductor process to screen out external noise. A display panel is disposed above the multifunctional digitizer module board and coupled thereto, displaying images.

23 Claims, 7 Drawing Sheets

DISPLAY SYSTEMS WITH MULTIFUNCTIONAL DIGITIZER MODULE BOARD

BACKGROUND

The invention relates to display systems, and more particularly, to display systems with multifunctional digitizer module board.

Many types of touch sensing devices, like digitizers etc. currently are used on or in conjunction with computer displays. Such touch sensing devices measure the position of position pointer or finger contact on the sensor surface and generates coordinates for interaction with the computer, for example in selecting icons on the display, menu items, editing images, and feedback for input of hand-drawn characters and graphics.

Such touch sensing devices may use any number of technologies, including capacitive sensing, resistive sensing using a conductive overlay sheet, infrared sensing, acoustic wave sensing, and piezoelectric force sensing. Digitizers which use hardwired handheld position pointer such as pens typically use electromagnetic, electrostatic, resistive, or sonic pulse sensing.

Touch sensing devices responsive to human contact are typically used for cursor control, such as selection of display icons and menu items or responsive to position pointer (usually a hardwired pen) are used to create or trace drawings, blueprints, or original art. These touch sensing devices are also used for character or handwriting recognition. It is therefore desirable that the touch sensing devices reproduce the path of the position pointer by some visual means to provide visual feedback.

Some of these touch sensing devices are responsive to both user and position pointer contact, thereby providing the convenience of position pointer-based input, for example when writing on the screen, as well as the ease of touch input, which does not require position pointer.

FIG. 1 is a structural diagram of a conventional display device with a digitizer. As shown, the display device 200 comprises a top glass cover 210, the liquid crystal display (LCD) panel 220, a back light module 230, a reflector 240, the digitizer sensor board 250, a shield film 260, a back frame 270 and a position pointer 280. The top glass cover 210, the LCD panel 220, the back light module 230, the reflector 240, the digitizer sensor board 250, the shield film 260 and the back frame 270 are assembled as a laminated construction, and the digitizer sensor board 250 and the position pointer 280 constructing a digitizer. The LCD panel 220 and the digitizer sensor board 250 are coupled to an external host system via differential interfaces, such as two flexible printed circuit boards (FPCs). FIG. 2 is a circuit diagram of a conventional display system 100 which comprises LCD module 110 and digitizer module board 120. The LCD module 220 and the digitizer module board 120 are coupled to the host system 130 via corresponding interfaces 112 and 122 respectively. The digitizer module board 120 requires an oscillator 124 disposed in the microcontroller 126 to generate scan timing signals (not shown) for the selection circuit 128, thereby performing scan operation of digitizer sensor array 129. Because the reflector, the digitizer sensor board, a shield film and a back frame in the conventional display system are separate components and the LCD panel and the digitizer sensor board require differential interfaces coupled to an external host system, the conventional display system presents higher cost, thickness, and weight.

SUMMARY

The invention is directed to provide a multifunctional digitizer module board that integrates a shield film on a flexible digitizer sensor board without adhesive material so as to lower thickness and weight.

In one aspect of the invention, a flexible digitizer sensor board senses position of a position pointer or touch on a surface and a shield film is integrated on one surface of the digitizer sensor board by semiconductor process.

In another aspect, the invention discloses embodiments of a display system, in which a LCD panel displays images and a multifunctional digitizer module board disclosed here, senses position of a position pointer or finger contact on a surface.

In another aspect, the invention discloses embodiments of a fabrication method of a display system, in which a multifunctional digitizer module board comprising a flexible digitizer sensor board and a shield film is provided to sense position of a position pointer or finger contact on a surface, wherein the shield film is laminated with the digitizer sensor board without adhesive material. A LCD panel is disposed above the multifunctional digitizer module board.

DESCRIPTION OF THE DRAWINGS

The invention can be more fully understood by the subsequent detailed description and examples with reference made to the accompanying drawings, wherein.

DETAILED DESCRIPTION

Figure 3:
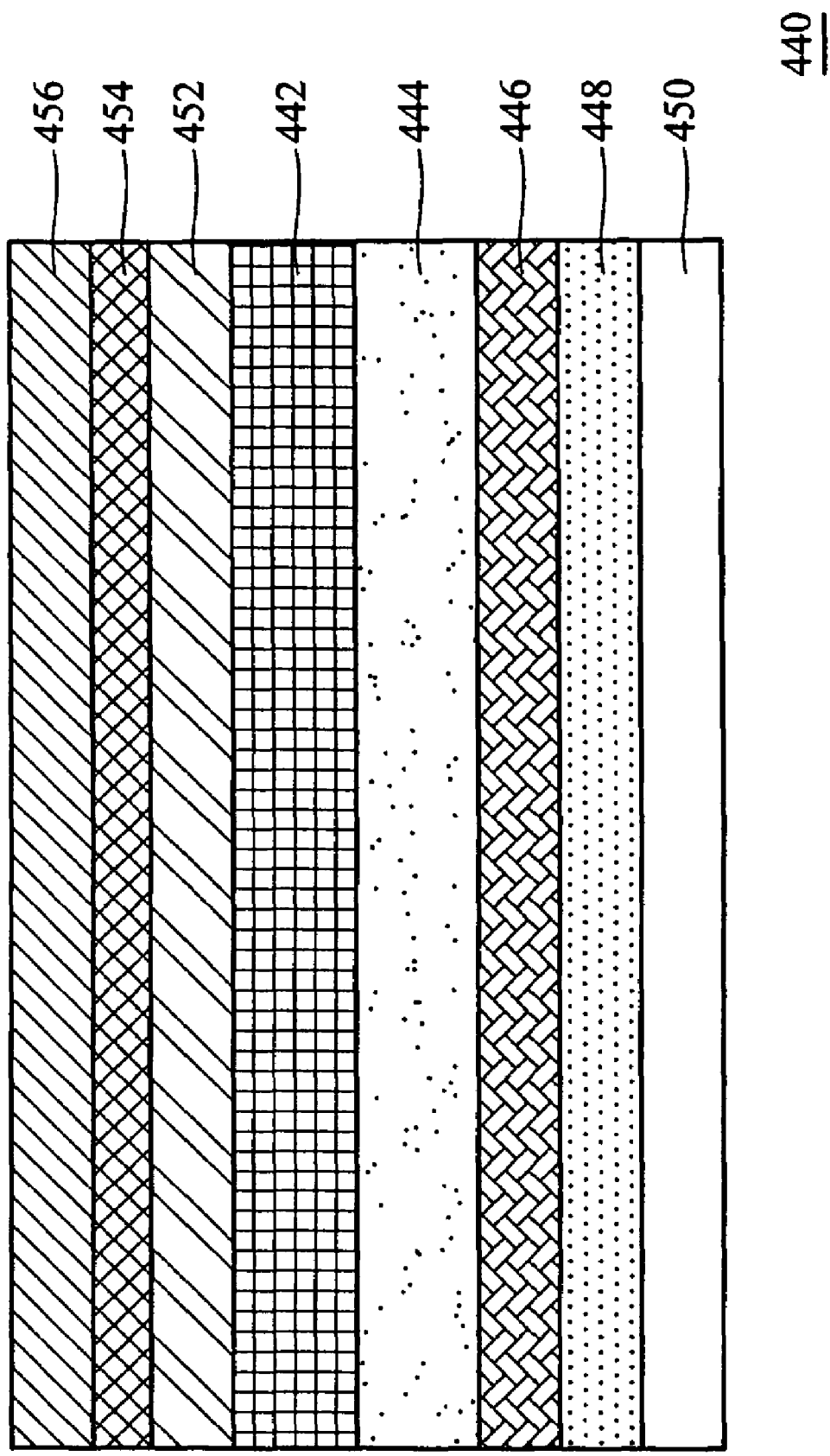
FIG. 3 shows an embodiment of a multifunctional digitizer module board.

FIG. 3 shows an embodiment of a multifunctional digitizer module board.

As shown, the multifunctional digitizer module board 440 comprises a top protective film 456, a reflective film 454, a first protective film 452, a flexible digitizer sensor board 442, a second protective film 444, a shield film 446 and a separator 450, which the top protective film, the first and the second protective film can be $SiO_x$ or $SiN_x$. In this embodiment, the top protection film 456, the reflective film 454, and the shield film 446 are integrated to the flexible digitizer sensor board 442. In this case, the first protective film 452 is formed between the flexible digitizer sensor board 442 and the reflective film 454 and the second protective film 444 is formed between the shield film 446 and the flexible digitizer sensor board 442 by semiconductor process. The separator 450 is disposed on the shield film 446 by the adhesive material 448.

The sensor for flexible digitizer sensor board 442 can be, for example, a capacitive sensor, a resistive sensor, an infrared sensor, an acoustic wave sensor, a piezoelectric force sensor, an electrostatic sensor, or a sonic pulse sensor, to sense position of a position pointer or finger contact on a surface. In some examples, the flexible digitizer sensor board 442 comprises a sensor array or metal coil grids printed on a flexible substrate, such as polyethylene terephthalate (PET) or cellulose triacetate (TAC). The sensor array or the metal coil grids can be printed on the flexible substrate by screen-printing for large patterns or ink-jet printing for small patterns, depending on design, but is not limited thereto. For example, conductive metal pastes or inks, such as Ag or Cu based formulations, can be used for screen-printing or ink-jet printing.

The second protective film 444 is formed on the bottom surface of the flexible digitizer sensor board 442 by semiconductor process. The shield film 446 is integrated on the surface of the second protective film 444 by semiconductor process to screen out external noise. The shield film 446 can be a thin metal foil with high magnetic susceptibility, such as Fe—Ni, Fe—Si or Fe—Co. The shield film 446 can be integrated on the surface of the protective film 444 by physical vapor deposition (PVD) or sputtering for high frequency applications.

The first protective film 452 is formed on the top surface of the flexible digitizer sensor film 442 by semiconductor process. The reflective film is formed on the surface of the first protective film 452 by semiconductor process, to reflect light. In this case, the first protective film 452, the reflective film 454, and top protective film 456 can be optional. In some examples, the reflective film 454 can also be deposited directly on the flexible digitizer sensor board 442 after planarizing the flexible digitizer sensor board 442 or depositing on a separate thin plastic substrate and then laminating with the flexible digitizer sensor board 442. The reflective film 454 can be a thin metal foil, such as Al, Ag, alloy thereof, or different variations with optical reflection enhancement treatment.

The top protective film 456, the reflective film 454, and the shield film 446 are integrated to the flexible digitizer sensor board 442 by semiconductor process rather than adhesive material during assembly of the display device, and the separator 450 laminated with the shield film 446 by the adhesive material 448.

Thus, the top protective film 456, the reflective film 454, the first protective film 452, the shield film 446, the flexible digitizer sensor board 442, a second protective film 444 and the separator 450 form a single component for a display device. For example, the multifunction digitizer module board 440 can be applied to the back frame of a display device, immediately below the back light module, after removing the top protective film 456 and the separator 450.

Figure 4:
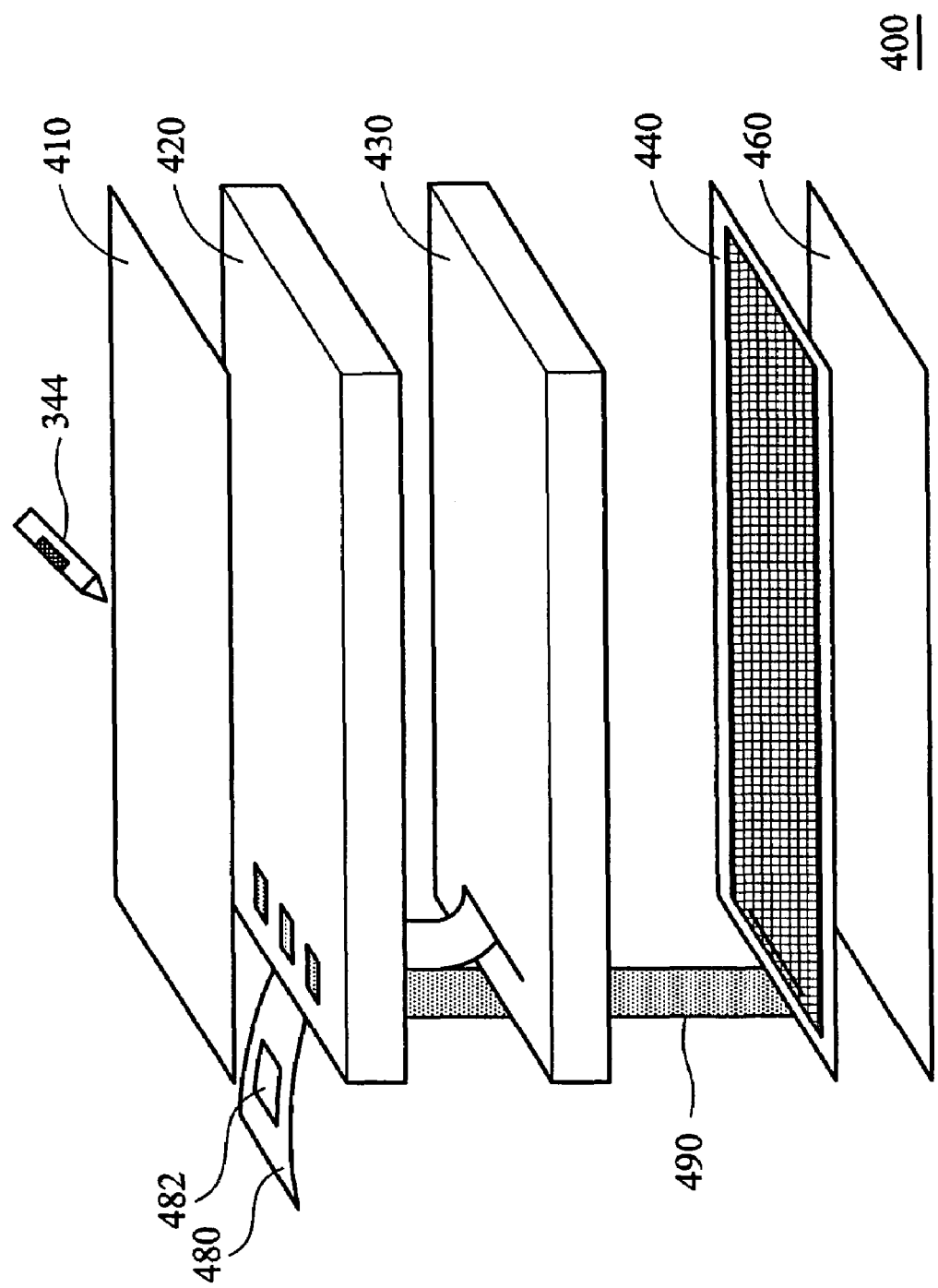
FIG. 4 is a structural diagram of a display device with a multifunctional digitizer module board according to the invention.

FIG. 4 is a structural diagram of a display device 400 with a multifunctional digitizer module board according to an embodiment of the invention.

As shown, the display device 400 comprises a top glass cover 410, a LCD panel 420, a back light module 430, the disclosed multifunctional digitizer module board 440 and a back frame 460. The LCD panel 420 and the multifunctional digitizer module board 440 are coupled to an external host system via a single interface 480, such as a flexible printed circuit board (FPC). The LCD panel 420 and the multifunctional digitizer module board 440 are connected by a flexible cable 490. A control unit 482 is mounted on the flexible printed circuit board 480 to drive the LCD panel and generate a scan timing signal (SS) to the digitizer module board according to an image signal from the host system via the interface such as a flexible printed circuit board 480. The multifunctional digitizer module board 440 executes a scan operation to generate position data (PD) in response to the scan timing signal (SS), the control unit 482 then determines the corresponding coordinate data (CD) of the position pointer 344 according to the position data for output to the host system. The control unit 482 can also, for example, be a chip on glass of the display panel 420.

In the embodiments of the invention, the LCD panel 420 can also be an organic light-emitting diode (OLED) panel, or a field emission display (FED) panel, but it is to be understood that the invention is not limited thereto. The multifunctional digitizer module board 440 integrate the reflective film 454, and the shield film 446 and the flexible digitizer sensor board 442 as shown in FIG. 3, therefore it can senses position of the position pointer 344 on the top glass cover 410 and also screens out external noise or reflects light. According to the flexible digitizer sensor board 442 therein, the multifunctional digitizer module board 440 can also be a capacitive sensing digitizer module board, a resistive sensing digitizer module board, an infrared sensing digitizer module board, an acoustic wave sensing digitizer module board, or a piezoelectric force sensing digitizer module board, an electrostatic sensing digitizer module board, or a sonic pulse sensing digitizer module board.

Because the display system of the embodiment of the invention requires only a flexible digitizer sensor board integrated with a shield film 446 and a reflective film 454 (if needed), it provides lower thickness and weight than a conventional display system with separate components.

Figure 5:
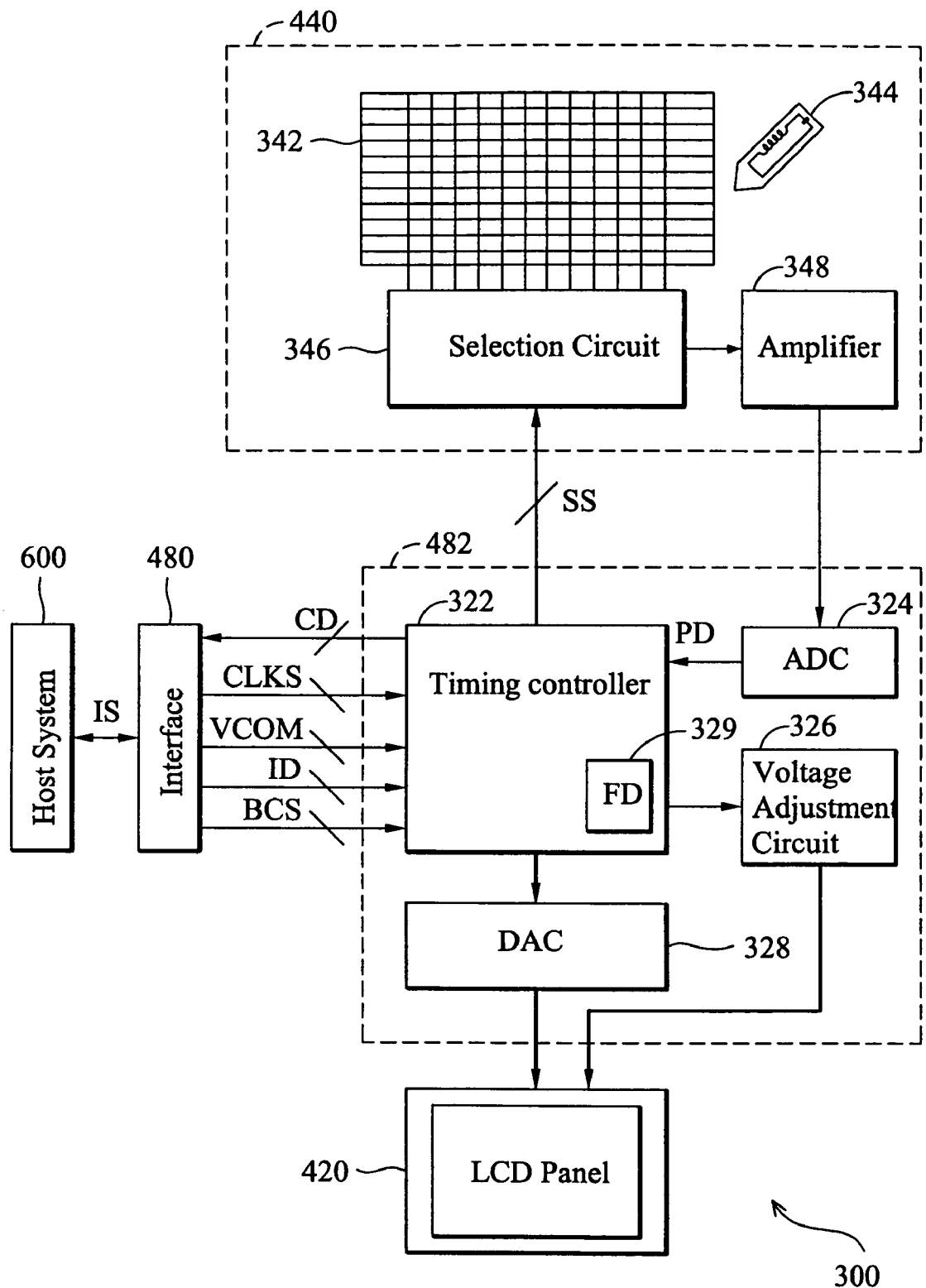
FIG. 5 is a block diagram of a first embodiment of a display system.

FIG. 5 is a circuit diagram of an embodiment of a display system 300. The display system 300 comprises an interface 480, the control unit 482, the LCD panel 420, and the multifunctional digitizer module board 440.

The interface 480 is coupled between the host system 600 and the control unit 482, to exchange data with the host system.

The control unit 482 is coupled to the interface 480, the LCD panel 420 and the multifunctional digitizer module board 440. The control unit 482 drives the LCD panel 420 and generates a scan timing signal (SS) to the multifunctional digitizer module board 440 according to an image signal (IS) from the host system 600 via the interface 480. The control unit 482 comprises a timing controller 322, an analog-to-digital converter 324, a voltage adjustment circuit 326 and a digital-to-analog converter (DAC) 328. The control unit 482 also receives bus control signals (BCS) from the host system 600 via the interface 480, controlling the operations of the ADC 324, DAC 328 and the selection circuit 346.

The timing controller 322 is coupled to the interface 480, the LCD panel 420 and the multifunctional digitizer module board 440, generating a driving signal by the DAC 328 according to the image signal (IS) from the host system 600. Typically, the image signal from the host system comprises image data (ID), a clock signal CLKS and common voltage Vcom, in which the clock signal CLKS includes a vertical scan signal Vs, a horizontal scan signal Hs, a data enable signal DE and a system clock CLK. The timing controller 322, according to the clock signal CLKS of the image signal, provides reference timing signals, such as a vertical clock output CKV, a horizontal clock output CKH, a horizontal enable output ENBH, a vertical enable output ENBV, a horizontal scan direction CSH and a vertical scan direction CSV, for the display panel 420. The reference timing signal and the image data ID serve as the driving signal and are output to the DAC 328 for conversion to analog signals driving the display panel 330. The voltage adjustment circuit 326 is coupled to the timing controller 322 and the display panel 420, adjusting the voltage level analog signal driving the display panel 420 according to the common voltage Vcom.

Also, timing controller 322 generates the scan timing signal SS to the multifunctional digitizer module board 440 according to the image signal from the host system 600. Because the frequency of scan timing signals required in the multifunctional digitizer module board is between about 100 KHz and 300 KHz and the frequency of the clock signal CLKS in the image signal from the host system is between 5MHz and 6 MHz typically, the embodiment down-converts the clock signal CLKS in the image signal from the host system to obtain a scan timing signal SS of a suitable frequency without utilizing an oscillator as a conventional digitizer module board. Thus, in this embodiment, the multifunctional digitizer module board 440 and the LCD panel 420 are coupled to the host system 600 via a single interface, and the microcontroller of the multifunctional digitizer module board 440 is integrated to that of the display panel. In this embodiment, timing controller 322 comprises a frequency divider 329 to convert the clock signal of the image signal to the scan timing signal SS with a frequency suitable for the multifunctional digitizer module board 440.

The LCD panel 420 is coupled to the control unit 482 to display images according to the analog signals from the DAC 328. The display panel can also be an organic light-emitting diode (OLED) display panel, or a field emission display (FED) panel.

The multifunctional digitizer module board 440 is typically used for cursor control applications, such as selection to display icons and menu items, creating or tracing drawings or blueprints, or for character or handwriting recognition. In this embodiment, the multifunctional digitizer module board 440 is coupled to the host system 600 via the same interface 480 and executes a scan operation to generate position data PD in response to the scan timing signal SS. The multifunctional digitizer module board 440 comprises a digitizer sensor array 342, a selection circuit 346, and an amplifier 348. In some examples, the digitizer sensor array 342, the selection circuit 346 and the amplifier 348 are formed on the flexible digitizer sensor board 442 shown in FIG. 3. Alternately, the selection circuit 346 and the amplifier 348 can be integrated to the control unit 482 (not shown). For example, the multifunction digitizer module board can be an electromagnetic sensing digitizer module board, in which electromagnetic signals are transmitted from the position pointer 344 and sensed by the sensor array 342.

The digitizer sensor array 342, for example, comprises metal coil grids in both X and Y orientations, sensing the position of the position pointer 344. The position pointer 344 transmits signals to the digitizer sensor array, and the selection circuit 346 performs the scan operation of the coils in the sensor array 342 according to the scan timing signal from the control unit 482, such that signals induced in the sensor array 342 are sent to the amplifier 348, and the amplifier 348 amplifies the induced signals in the sensor array 342.

The amplified signals from the amplifier 348 are output to the ADC 324 and converted to position data PD to the control unit. The control unit 322 receives the position data PD relative to the pointer 344 and determines the corresponding coordinate data CD of the pointer 344 accordingly. The corresponding coordinate data CD of the pointer 344 is then output to the host system 600 via the interface 480. For example, the control unit 482 can be a single chip integrated by the timing controller 322, the ADC 324, the voltage adjustment circuit 326, and the DAC 328. The control unit 320 can also be a chip on glass (COG) of the display panel 330 or mounted on a flexible printed circuit board (FPC) of the display panel 420.

Figure 6:
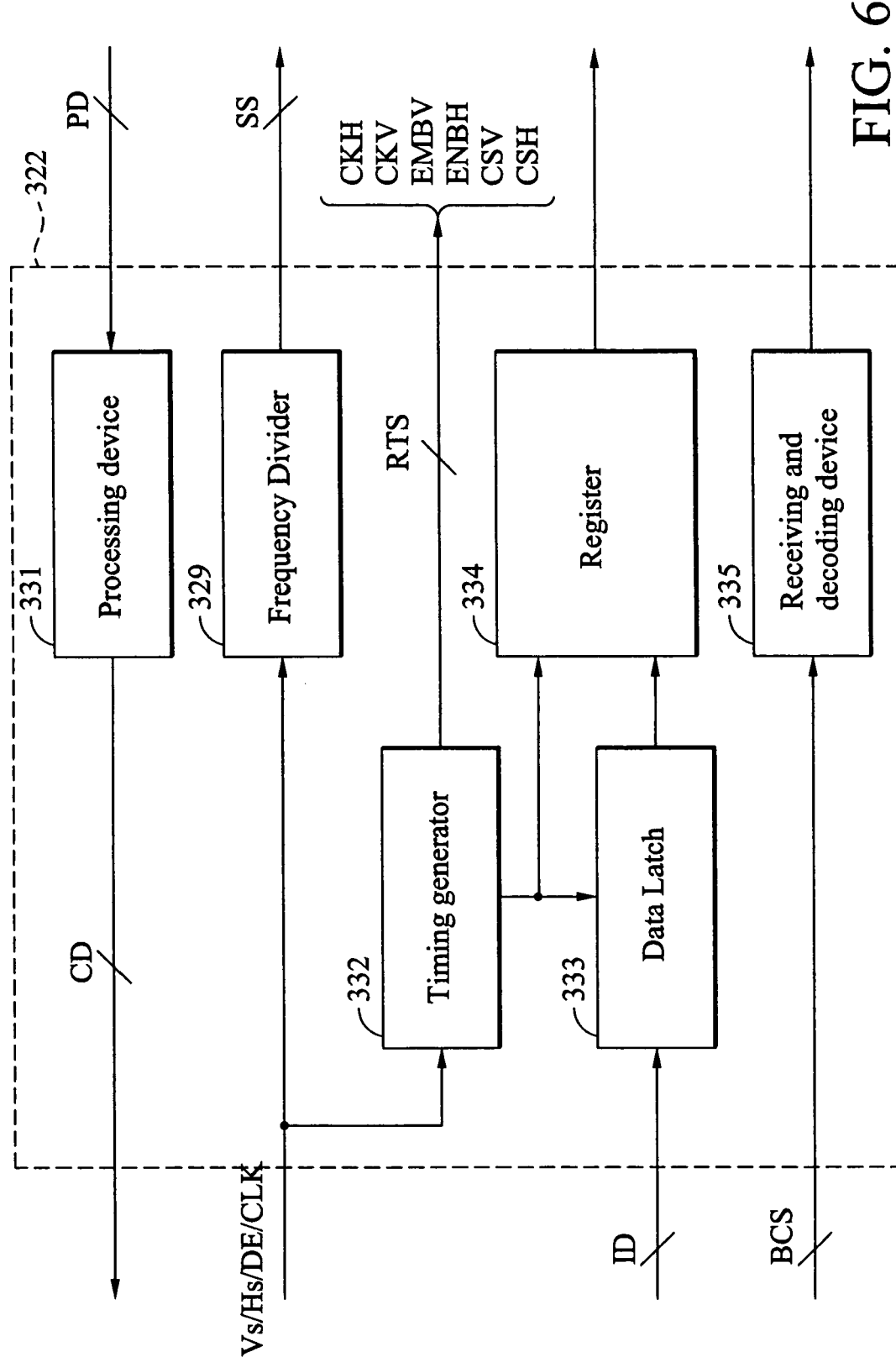
FIG. 6 shows an embodiment of a timing controller.

FIG. 6 shows an embodiment of a timing controller. The timing controller 322 comprises a processing device 331, a frequency divider (FD) 329, a timing generator 332, a data latch 333, a register 334, and a receiving and decoding device 335, and receives the image signal IS and bus control signal BCS from the host system 600 via the interface 480.

The processing device 331 is coupled to the ADC 324 to receive the position data PD and calculate the corresponding coordinate data CD for output to the host system 600 via the interface 480. The host system 600 receives the coordinate data CD and converts to image signal to display on the display panel. The frequency divider 329 converts the clock signal CLKS of the image signal to the scan timing signal SS with a suitable frequency, such as 100 KHz~300 KHz, for the multifunctional digitizer module board 440.

The timing generator 332 also receives the clock signal CLKS to provide reference timing signals RTS for the display panel 420. The image data ID in the image signal IS from the host system 600 is temporarily stored by the data latch 333 and the register 334 and output to the DAC 328 to drive the display panel 420. The receiving and decoding device 335 receives the bus control signal BCS from the host system 600 to generate control data controlling operations of the DAC 328, the ADC 324 and the selection circuit 346.

Figure 1:
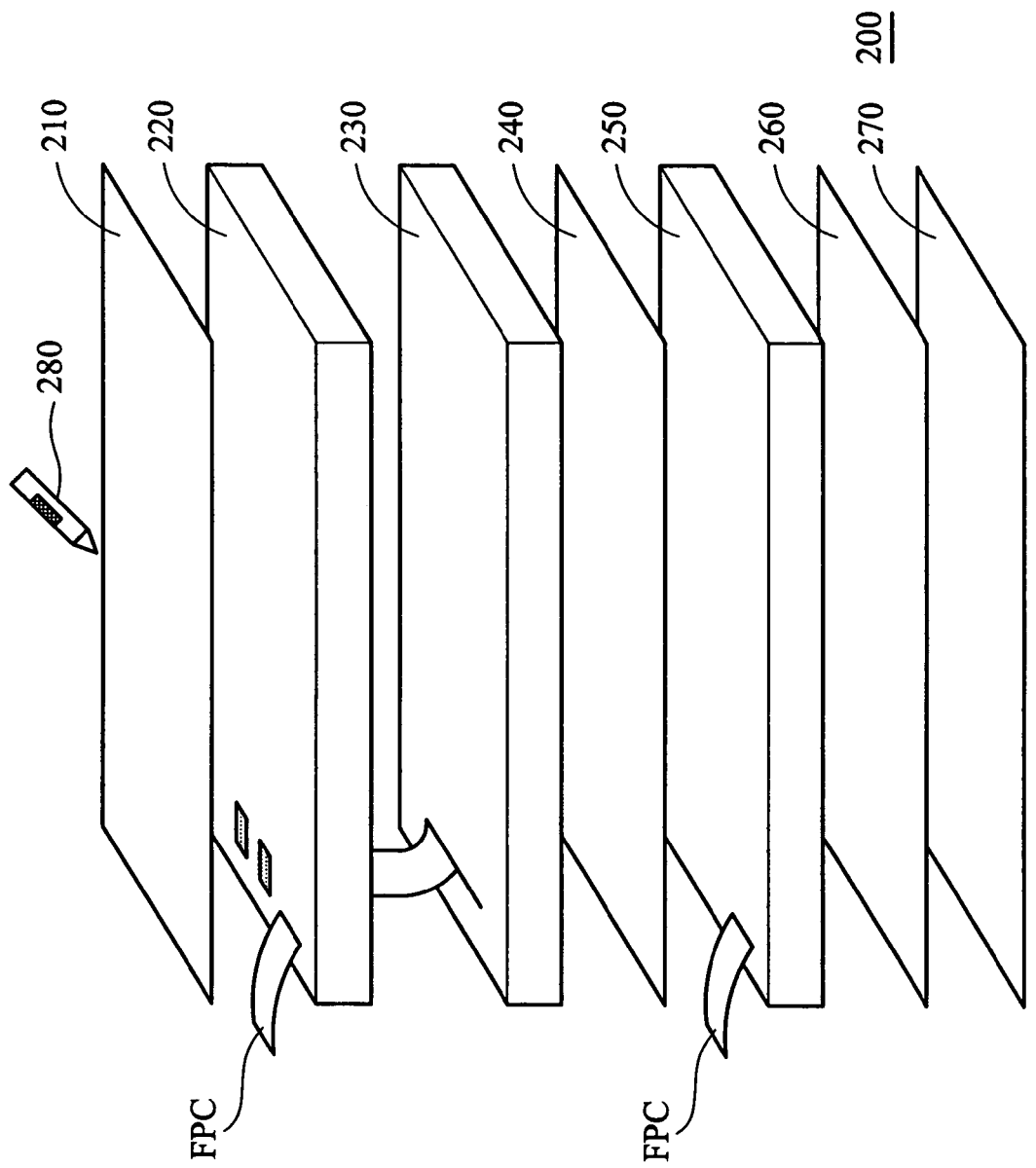
FIG. 1 is a structural diagram of a conventional display device with digitizer.
Figure 2:
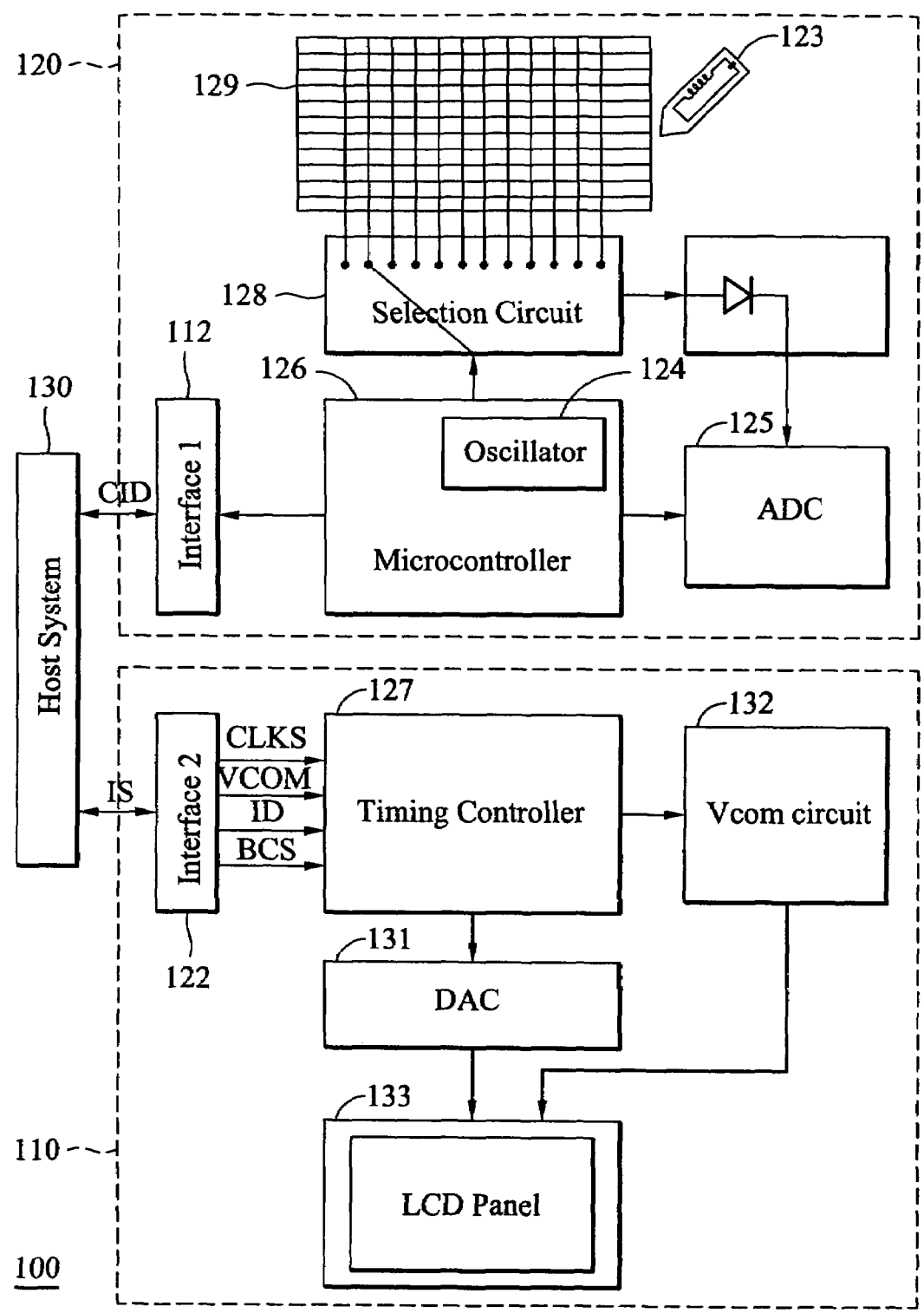
FIG. 2 is a circuit diagram of a LCD module and a digitizer module board in the conventional display system.

Thus, some embodiments of the invention can use a single interface and integrate microcontroller 126, ADC 125 for the multifunctional digitizer module board 120, and timing controller 127, the voltage adjustment circuit 132 and the DAC 131 for the LCD module 110 show in FIG. 2 into that of the display panel, such that cost, thickness and weight of the display system are be reduced.

Figure 7:
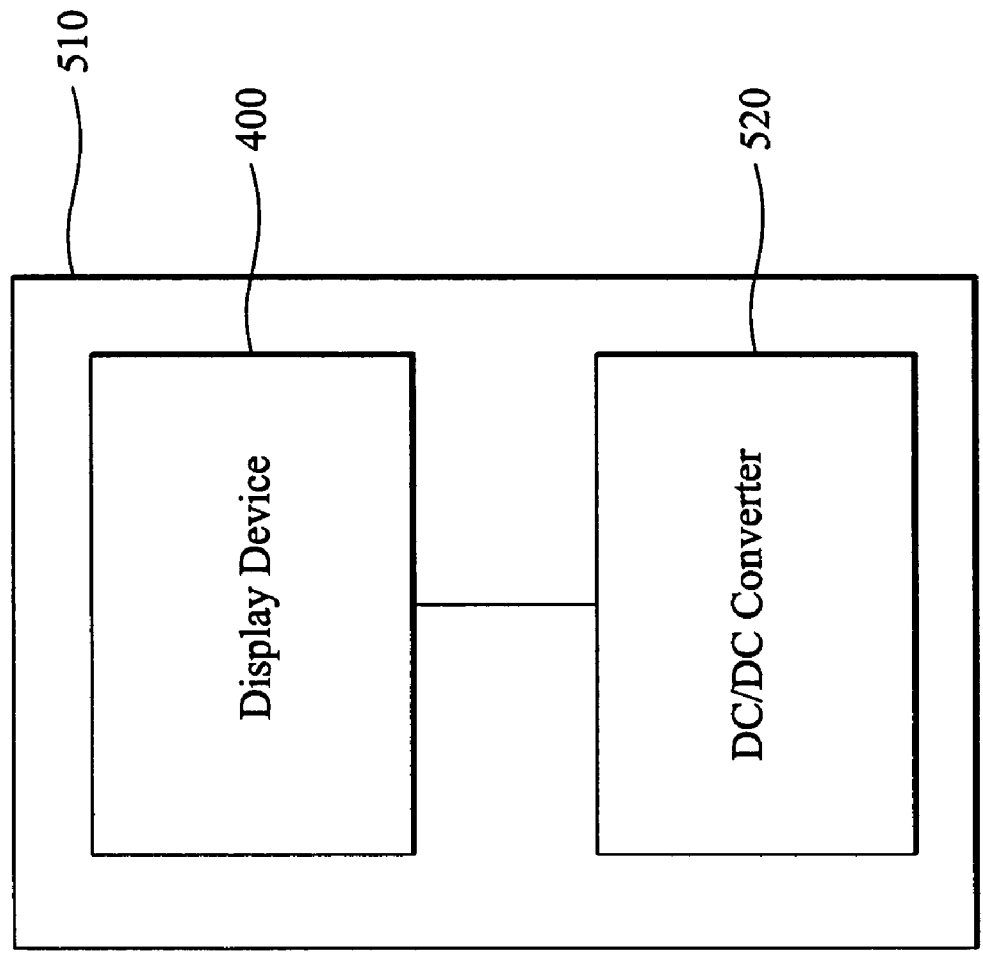
FIG. 7 schematically shows an electronic device incorporating a display system in accordance with embodiments of the present invention.

FIG. 7 schematically shows an electronic device 500 deploying display system 400 disclosed. The display system 400 can be a liquid crystal display system, an organic light-emitting diode (OLED) display system, or a field emission display (FED) system, although it is to be understood that the invention is not limited thereto. The electronic device 500 may be a portable device such as a PDA, notebook computer, tablet computer, cellular phone, or a display monitor device, etc. Generally, the electronic device 500 includes a housing 510, the display system 400 shown in FIG. 4, a DC/DC converter 520, etc. Further, the DC/DC converter 520 is operatively coupled to the display system 400 and provides an output voltage powering the display system 400 to display images.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A multifunctional digitizer module board, comprising:
   a digitizer sensor board, sensing position of a position pointer or finger contact on a surface;
   a shield film integrated on one surface of the digitizer sensor board without adhesive material, for screening out external noise, wherein the shield film is integrated with the digitizer sensor board by semiconductor thin film process;
   a reflective film laminated with the other surface of the digitizer sensor board to reflect light;
   a first protective film formed between the shield film and the digitizer sensor board; and a second protective film formed between the reflective film and the digitizer sensor board.

2. The multifunctional digitizer module board as claimed in claim 1, further comprising a separator laminated with the shield film by an adhesive material.

3. The multifunctional digitizer module board as claimed in claim 1, wherein the shield film and the reflective film are integrated with the digitizer sensor board by semiconductor process.

4. The multifunctional digitizer module board as claimed in claim 1, wherein the shield film is integrated on the digitizer sensor film by physical vapor deposition (PVD) or sputtering.

5. The multifunctional digitizer module board as claimed in claim 1, wherein the digitizer sensor board comprises a sensor array printed on a flexible substrate.

6. The multifunctional digitizer module board as claimed in claim 5, the sensor array is printed on the flexible substrate by screen-printing or ink-jet printing.

7. The multifunctional digitizer module board as claimed in claim 5, wherein the flexible substrate comprises polyethylene terephthalate (PET) or cellulose triacetate (TAC).

8. A display system, comprising:
a multifunctional digitizer module board as claimed in claim 1; and
a display panel, disposed above the multifunctional digitizer module board and coupled thereto, displaying images.

9. The display system as claimed in claim 8, further comprising a back light module coupled to the display panel.

10. The display system as claimed in claim 8, further comprising a control unit coupled to the display panel and the multifunctional digitizer module board according to an image signal from a host system via an interface, driving the display panel and generating a scan timing signal to the multifunctional digitizer module.

11. The display system as claimed in claim 10, wherein the multifunctional digitizer module executes a sensing operation to detect the position of a stylus or finger contact on the surface in response to the scan timing signal.

12. The display system as claimed in claim 11, wherein the image signal comprises image data and a clock signal, and the control unit generates the scan timing signal according to the clock signal.

13. The display system as claimed in claim 10, wherein the control unit is a chip on glass (COG) on the display panel.

14. The display system as claimed in claim 10, wherein the control unit is mounted on a flexible printed circuit board (FPC).

15. The display system as claimed in claim 10, wherein the display panel is a liquid crystal display (LCD) panel, an organic light-emitting diode (OLED) display panel or a field emission display (FED) panel.

16. An electronic device, comprising:
a display system as claimed in claim 8; and
a DC/DC converter operatively coupled to the display system, powering the display system to display images.

17. The electronic device as claimed in claim 16, wherein the electronic device is a display monitor, a notebook computer, a tablet computer, a cellular phone or a personal digital assistant (PDA).

18. fabrication method for a multifunctional digitizer module board, comprising:
providing a digitizer sensor board; and
forming a shield film on one surface of the digitizer sensor board by semiconductor thin film process;
forming a reflective film on the other surface of the digitizer sensor board by deposition process;
forming a first protective film formed between the shield film and the digitizer sensor board; and
forming a second protective film formed between the reflective film and the digitizer sensor board.

19. The fabrication method as claimed in claim 18, further comprising forming a separator laminated with the shield film by an adhesive material.

20. The fabrication method as claimed in claim 18, wherein the shield film is formed on the digitizer sensor film by physical vapor deposition (PVD) or sputtering.

21. The fabrication method as claimed in claim 18, wherein the digitizer sensor board comprises a sensor array printed on a flexible substrate.

22. The fabrication method as claimed in claim 21, the sensor array is printed on the flexible substrate by screen-printing or ink-jet printing.

23. The fabrication method as claimed in claim 22, wherein the flexible substrate comprises polyethylene terephthalate (PET) or cellulose triacetate (TAC).

* * * * *